G. F. BOWDLE.
FRICTION DISK CLUTCH.
APPLICATION FILED SEPT. 20, 1909.
971,168.
Patented Sept. 27, 1910.
2 SHEETS—SHEET 1.
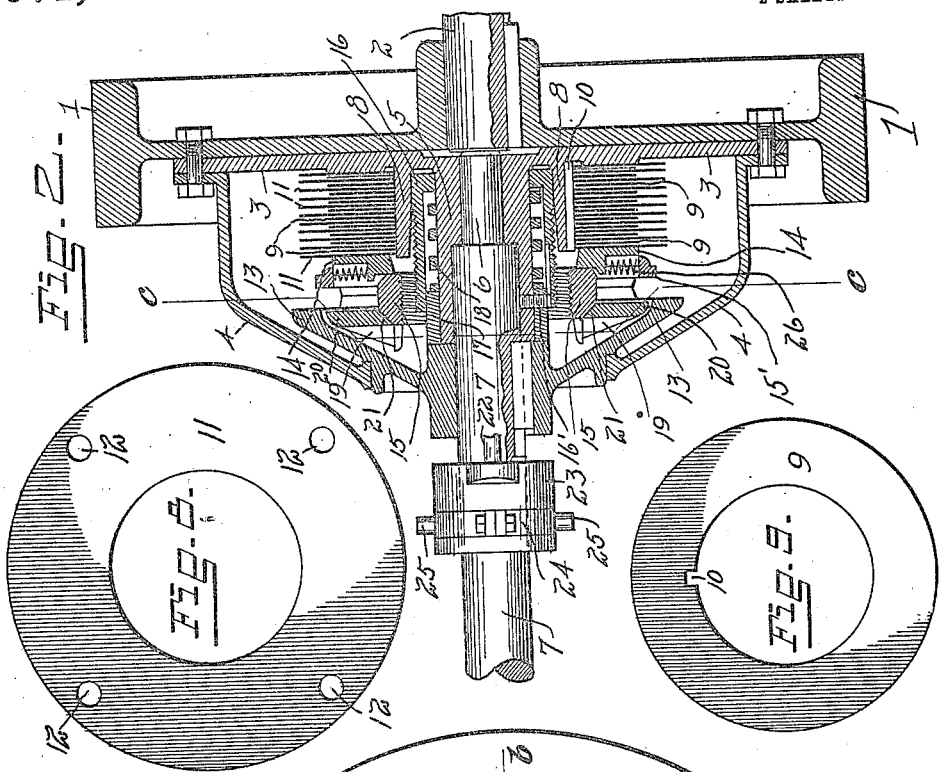
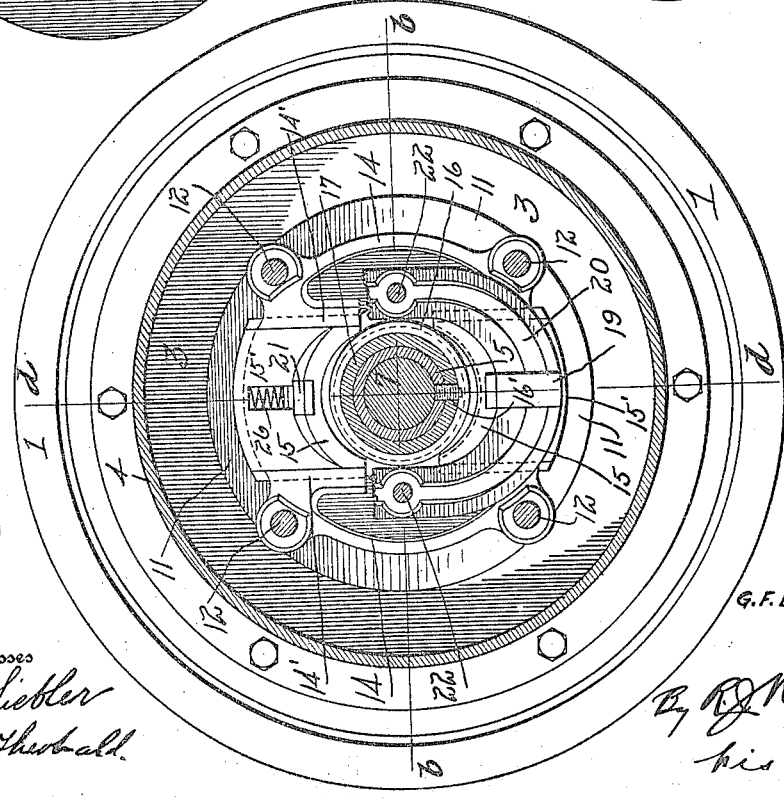
Witnesses
W. Siebler
C. M. Theobald
Inventor
G. F. BOWDLE.
By R. J. McCarty
his Attorney

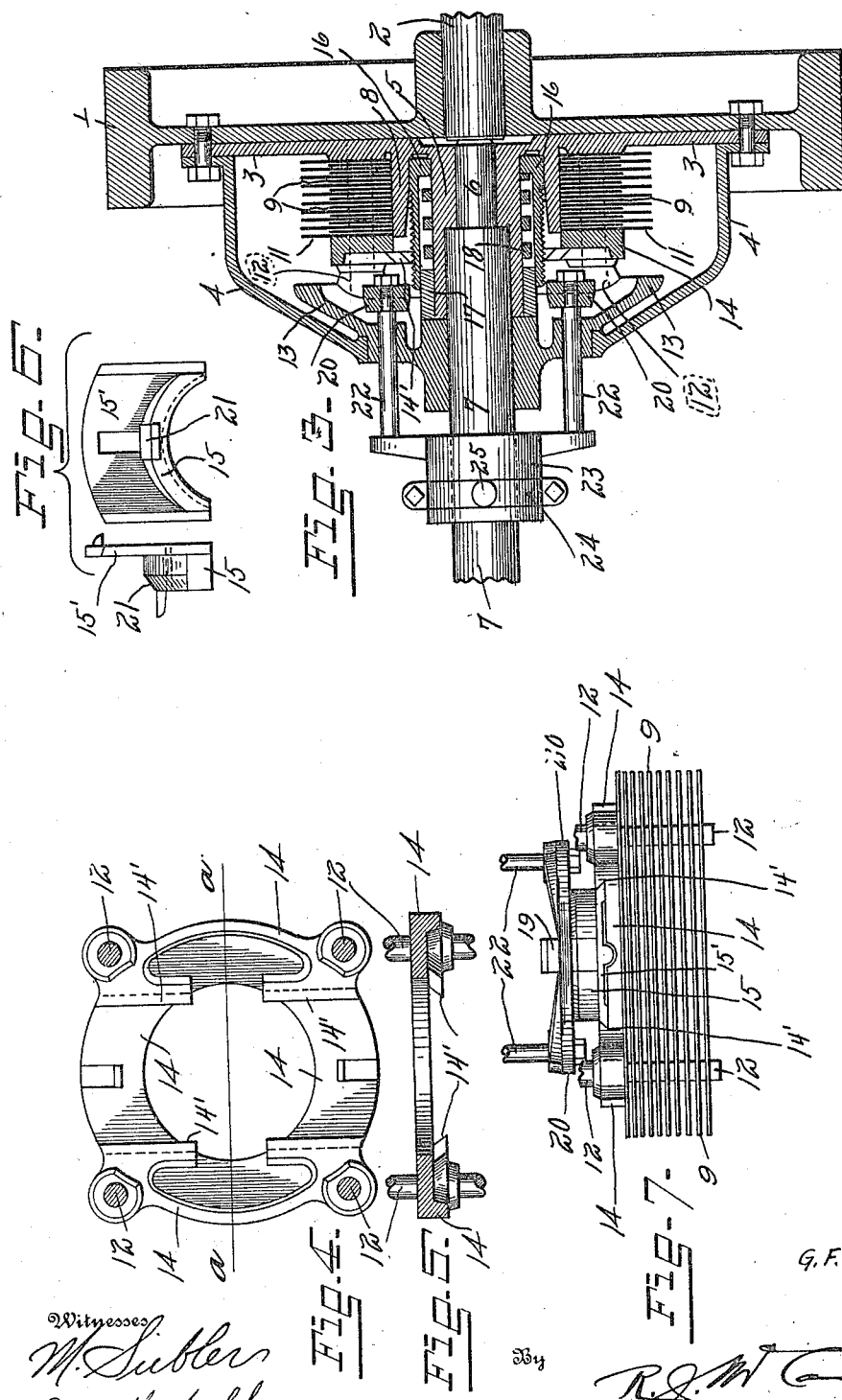

UNITED STATES PATENT OFFICE.

GEORGE F. BOWDLE, OF PIQUA, OHIO.

FRICTION DISK CLUTCH.

971,168.   Specification of Letters Patent.   Patented Sept. 27, 1910.

Application filed September 20, 1909. Serial No. 518,621.

*To all whom it may concern:*

Be it known that I, GEORGE F. BOWDLE, a citizen of the United States, residing at Piqua, in the county of Miami and State of Ohio, have invented certain new and useful Improvements in Friction Disk Clutches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in friction disk clutches.

One of the objects of the invention is to provide a clutch that automatically tightens itself when set, and which will gradually become tighter until all the parts of the clutch rotate in unison, such form of clutch being especially adapted for automobiles.

Other objects of the invention are to provide a clutch of the above type in which the wear on the disks is taken up without the necessity of adjustment, and which gives practically a positive drive, with a short throw to set the clutch.

Referring to the drawings, Figure 1, is an end elevation with the housing removed. Fig. 2, is a section on the line $d\ d$ of Fig. 1. Fig. 3, is a section on the line $b\ b$ of Fig. 1. Fig. 4, is a detail of the split nut-supporting plate. This plate acts as a pressure plate for the friction disks. Fig. 5, is a section on the line $a\ a$ of Fig. 4. Fig. 6, is a detail of one-half of the split nut. Fig. 7, is a top plan view of the assembled friction disks, the pressure plate, the split nut, and the actuating frame for the split nut. Fig. 8 is a plan view of one of the friction disks carried by the driven member. Fig. 9 is a plan view of one of the friction disks carried by the driving member.

In the following description of the invention, similar reference characters indicate corresponding parts in the drawings.

1 designates a fly wheel mounted on a crank shaft 2 of a gasolene engine (not shown) and which supports a plate 3 and a housing 4. The plate 3 is provided with an extended hub 5 which forms a bearing for an end 6 of a driving shaft 7. The plate 3 and the housing 4 rotate with the fly wheel 1, but the driving shaft 7 and the parts rigidly mounted thereon are normally free and only rotate when the clutch is set. The plate 3 is also provided with a cylindrical extension 8 on which is slidingly mounted a plurality of friction disks 9, said disks being secured to said extension by a key 10. The disks 9 rotate with the fly wheel 1 and lie between a plurality of larger friction disks 11 which rotate with the driving shaft 7. The said disks 11 are slidingly mounted on rods 12 attached to a conical plate 13 keyed to the driving shaft 7. The rods 12 also slidingly support a pressure plate 14 adapted to press the friction disks 9 and 11 together when the clutch is set. The plate 14 is actuated to compress the disks by two halves or portions 15 constituting a split nut, and which are slidingly mounted on plate 14 by means of extensions 15' and guides 14'. The halves 15 of the split nut are placed in engagement with a resilient threaded sleeve 16 to actuate the pressure plate 14, by cam portions 19 on a frame 20 engaging cam portions 21 on the split nut consisting of the two parts 15. The frame 20 is mounted on rods 22 having bearings in the conical plate 13, and the outer ends of which are attached to a collar 23 slidingly mounted on the driving shaft 7.

The collar 23 is provided with a ring 24 having trunnions 25 by means of which the collar 23 is shifted to set and unset the clutch. When the collar 23 is thrown inwardly, it carries with it the frame 20 and the two halves 15 of the split nut are thrown in engagement with the threaded sleeve 16 by the cam portion 19 of the frame 20 engaging the cam portion 21 on the split nut 15. The threaded sleeve 16 rotates with the fly wheel 1 by means of a key 16' which projects into an elongated recess on the inside of the sleeve 16, and when so rotated, draws the two halves 15 of the split nut inwardly. This action draws the pressure plate 14 against the disks 9 and 11, and the driving shaft 7 will gradually begin to rotate. The sleeve 16 will continue to draw in the two halves 15 of the split nut, and the pressure plate 14, until all the parts of the clutch rotate in unison. When the collar 23 is thrown outwardly, the frame 20 releases the two halves 15 of the split nut, and they are disengaged from the threaded sleeve 16 by centrifugal force assisted by springs 26. This releases the pressure on the disks 9 and 11.

11, and the driving shaft 7 will not be rotated. The sleeve 16 is slidingly mounted on the hub 5, but rotates therewith through means of the key 16' and the inner elongated recess hereinbefore referred to, and its sliding movement is controlled by a spring 18. This construction allows the sleeve 16 to yield in case the driven shaft 7 should become excessively retarded, and thereby prevents parts of the clutch from breaking. In the event the sleeve 16 should yield during the operation of the clutch, the spring 18 returns it to its normal position when the clutch is released. The entire mechanism is incased by the conical plate 13, the housing 4, and the plate 3, and may therefore run in an oil bath.

I claim:

1. In a friction clutch, a plurality of friction disks, a pressure plate adapted to compress said disks, and resilient means actuated by the driving shaft for actuating said pressure plate.

2. In a friction clutch, a plurality of friction disks, means adapted to compress said disks, and a resilient threaded sleeve actuated by the driving shaft and adapted to actuate said disk-compressing means.

3. In a friction clutch, a plurality of friction disks, means adapted to compress said disks, threaded members adapted to actuate said disk-compressing means, and resilient means actuated by the driving shaft for actuating said threaded members to actuate the said disk-compressing means.

4. In a friction clutch, a plurality of friction disks, means for compressing said disks, threaded members actuating said compressing means, a resilient actuating member adapted to actuate said threaded members, and a cam member adapted to place said threaded members in operative relation with said actuating member.

5. In a friction clutch, a plurality of friction disks, a pressure plate adapted to compress said friction disks, split nut members mounted on said pressure plate, a resilient threaded sleeve adapted to be engaged by said split nut portions, and means for placing said split nut portions in engagement with said threaded sleeve.

6. In a friction clutch, a driving shaft, a driven shaft, a plurality of disks mounted on said driving shaft and lying between the disks on the driven shaft, a plurality of disks mounted on said driven shaft, a pressure plate adapted to compress all of said disks, a split nut adapted to actuate said pressure plate, a resilient threaded sleeve rotating with said split nut and said pressure plate, and means for placing said split nut in engagement with said threaded sleeve.

7. In a friction clutch, friction members, devices for placing said friction members in engagement, resilient threaded members actuated by the driving shaft, for actuating said devices, and means adapted to actuate said threaded members.

8. In a friction clutch, a driving shaft, a driven shaft, a plurality of plates mounted on said driving shaft, a plate mounted on said driven shaft having rods extending therefrom, a plurality of plates mounted on said rods and lying between the plates on the driving shaft, a ring adapted to compress all of said plates, and means actuated by the driving shaft adapted to actuate said ring.

9. In a friction clutch, a driving shaft, a driven shaft, a plurality of plates mounted on said driving shaft, a plate mounted on said driven shaft and having rods extending therefrom, a plurality of plates mounted on said rods and lying between the plates on the driving shaft, a ring mounted on said rods and adapted to compress all of said plates, nut portions mounted on said ring, a threaded sleeve adapted to be engaged by said nut portions, a cam adapted to place said nut portions in engagement with said sleeve, and means adapted to actuate said cam.

In testimony whereof I affix my signature, in presence of two witnesses.

GEORGE F. BOWDLE.

Witnesses:
GEO. W. BERRY,
MATTHEW SIEBLER.